(12) United States Patent
Granshaw et al.

(10) Patent No.: US 9,882,844 B2
(45) Date of Patent: Jan. 30, 2018

(54) OPAQUE MESSAGE PARSING

(71) Applicant: International Business Machines Corporation, Armonk, NY (US)

(72) Inventors: David Granshaw, Hursley Park (GB); Samuel T. Massey, Hursley Park (GB); Daniel J. McGinnes, Hursley (GB); Martin A. Ross, Hursley Park (GB); Richard G. Schofield, Hursley (GB); Craig H. Stirling, Hursley (GB)

(73) Assignee: International Business Machines Corporation, Armonk, NY (US)

(*) Notice: Subject to any disclaimer, the term of this patent is extended or adjusted under 35 U.S.C. 154(b) by 718 days.

(21) Appl. No.: 14/512,391

(22) Filed: Oct. 11, 2014

(65) Prior Publication Data
US 2015/0161098 A1    Jun. 11, 2015

(30) Foreign Application Priority Data
Dec. 10, 2013   (GB) .................................... 1321821.9

(51) Int. Cl.
*G06F 17/30*  (2006.01)
*H04L 12/58*  (2006.01)
(Continued)

(52) U.S. Cl.
CPC .......... *H04L 51/04* (2013.01); *G06F 17/2247* (2013.01); *G06F 17/2264* (2013.01); *G06F 17/272* (2013.01); *G06F 17/30914* (2013.01)

(58) Field of Classification Search
None
See application file for complete search history.

(56) References Cited

U.S. PATENT DOCUMENTS 5,446,726 A * 8/1995 Rostoker ............... G06F 13/128
                                                         348/E5.002
7,391,735 B2   6/2008 Johnson
(Continued)

FOREIGN PATENT DOCUMENTS

WO   WO2007038706 A1   4/2007
WO   WO2010043018 A1   4/2010

OTHER PUBLICATIONS

"Parsing and message flow performance," IBM Integration Bus Version 9.0.0.2 Operating Systems: AIX, HP-Itanium, Linux, Solaris, Windows, z/OS, IBM Corporation, copyright 1993, 2013, 2 pages. Last updated Jul. 5, 2014, http://www-01.ibm.com/support/knowledgecenter/SSKM8N_7.0.0/com.ibm.etools.mft.doc/ac21000_.htm.
(Continued)

*Primary Examiner* — Tuan Dao
(74) *Attorney, Agent, or Firm* — Stephen R. Yoder

(57) ABSTRACT

A computer-implemented method of parsing a message comprising a sequence of data fields, the method comprising evaluating program code for processing the parsed message to identify a first set of data fields of the message that are referenced in said program code; identifying the boundaries of the data fields in a schema defining the format of said message; identifying a second set of data fields in said schema related to the first set of data fields by reference, said second set further including the first set; and sequentially parsing the message using the identified data field boundaries, wherein said parsing step comprises skipping data fields in said sequence that precede the first data field belonging to the second set. A computer program product comprising program code for implementing this method and a data processing system adapted to implement this method are also disclosed.

14 Claims, 5 Drawing Sheets

(51) Int. Cl.
 *G06F 17/27* (2006.01)
 *G06F 17/22* (2006.01)

(56) References Cited

U.S. PATENT DOCUMENTS

| | | | |
|---|---|---|---|
| 7,844,957 B2 | 11/2010 | Doucette et al. | |
| 2004/0088734 A1* | 5/2004 | Donlan | H04N 7/17318 |
| | | | 725/109 |
| 2005/0204051 A1 | 9/2005 | Box et al. | |
| 2006/0010195 A1 | 1/2006 | Mamou et al. | |
| 2007/0162421 A1* | 7/2007 | Pang | G06F 17/3056 |
| 2008/0176567 A1* | 7/2008 | Oba | H04W 36/005 |
| | | | 455/436 |
| 2009/0125495 A1 | 5/2009 | Zhang et al. | |
| 2012/0174060 A1* | 7/2012 | Rivkin | G06F 8/34 |
| | | | 717/105 |
| 2012/0246337 A1* | 9/2012 | Ross | H04L 45/308 |
| | | | 709/238 |
| 2012/0271802 A1* | 10/2012 | Oh | H03M 7/30 |
| | | | 707/693 |
| 2013/0232108 A1* | 9/2013 | Bostick | G06F 17/2247 |
| | | | 707/610 |

OTHER PUBLICATIONS

"Specifying opaque elements for the XMLNSC parser," WebSphere Message Broker 7.0.0, IBM Corporation, copyright 1999, 2014, 1 page. Last updated Jul. 5, 2014, http://www-01.ibm.com/support/knowledgecenter/SSKM8N_7.0.0/com.ibm.etools.mft.doc/ac21000_.htm.

Amagasa et al., "Energy-Efficient XML Stream Processing through Element-Skipping Parsing," 24th International Workshop on Database and Expert Systems Applications, Aug. 2013, pp. 254-258.

Piper, "WebSphere Message Broker: Designing for Performance (1346A)," Presentation, Impact2010: The Premier Conference for Business and IT Leaders, May 2010, 106 pages.

* cited by examiner

OPAQUE MESSAGE PARSING

CROSS REFERENCE TO RELATED APPLICATION(S)

This application claims the benefit of priority to United Kingdom Patent Application No. GB1321821.9, filing date Dec. 10, 2013, the contents of which are incorporated herein by reference.

FIELD OF THE INVENTION

The present invention relates to a method of passing a message such as a message communicated in a service-oriented architecture (SOA).

The present invention further relates to a computer program product comprising computer-readable program code that enables a processor of a data processing system to implement such a method.

The present invention yet further relates to a data processing system including a processor adapted to implement such a method.

BACKGROUND

Nowadays, many business processes rely on service-oriented architectures (SOAs). Such architectures facilitate the cooperation of computers over a network such as the Internet without requiring an agreed communication standard, e.g. message format, for communications between such computers. This is realized by providing software programs that provide application functionality as services to other applications. Such services are typically independent of vendor, product or technology.

As is known per se, a service is a self-contained unit of functionality, which can be combined by other software applications to provide the complete functionality of a large software application. Every computer hosting part of the SOA can run an arbitrary number of services, and each service is built in a way that ensures that the service can exchange information with any other service in the network with minimal human interaction and without the need to make changes to the underlying program itself.

Services are typically requested and deliverables are typically returned in the form of messages between computers or between software applications running on these computers to be more precise. Such messages typically comprise a plurality of data fields, wherein each data field contains information element such as a definition of another data field, a user-specified parameter or variable, and so on. In order to maximize reusability, such messages are frequently created using some template in which the format of the plurality of data fields is predefined, such that many different messages can be generated using the same template. The direct consequence of this approach is that a message generated by a consumer requesting a service typically contains both relevant and redundant information, because only a part of the message template contains information relevant to the requested service. This is because the template typically includes a large number of different types of data fields, such that the message can be used for many different purposes.

Moreover, messages may be generated in many different formats, which format for instance may depend of the platform and/or the programming language used to generate the message. Therefore, in order to be able to forward the message to an intended destination, e.g. a computer offering a particular service, the incoming message typically need to be converted into a format that can be understood by its destination or at least the relevant information needs to be extracted from the incoming message.

To this end, the SOA typically comprises a message broker, which is a software module implementing the required message conversion or data extraction. To this end, the message broker typically has access to so-called message schemas, which define the structure and the type of contents that each data field within the message can contain. In other words, a message schema explains the formats available in the message template from which the message has been generated. As will be apparent, such a message schema is specific to a particular template, e.g. a template generated in a specific language such as XML.

The message broker typically further comprises some flow logic, i.e. program code, which for instance may include routing information for routing the relevant contents of the message to the intended destination. This is because there may be multiple service providers providing a similar service, wherein the appropriate service provider is selected based on specific information in the message, which specific information enables the identification of the appropriate service provider by the flow logic.

For the message broker to successfully pass on the message or relevant contents thereof to an intended destination, the message broker typically requires one or more parsers that parse the incoming message based on the information provided by the message schema of that message. A parser is called when the bit stream that represents an input message is converted to the internal form that can be handled by the broker. Parsers are called when required by the message flow.

Parsing is a time-consuming and therefore costly exercise. Parsing becomes particularly costly when the whole message has to be parsed, because the message typically, comprises a large number of data fields as explained above. For this reason, techniques have been proposed in which only parts of a message are explicitly parsed in order to provide a cost-saving. Such techniques typically rely on the sequential nature of the parsing process, wherein the sequence of data fields are parsed one at a time in a sequential manner. Examples of such techniques include eager parsing, in which all data fields up to and including the relevant data fields are parsed and irrelevant subsequent data fields are discarded or simply copied over into an output message without parsing.

Another example of such a selective parsing technique is present in the IBM Integration Bus™ products of the IBM Corporation. In these products, a user can identify certain data fields in a message that are never referenced by the message flow, and can request that the identified data fields are parsed opaquely. This means that these elements are simply copied across the message flow. This reduces the costs of parsing and writing the message, and may improve performance in other parts of the message flow. Opaque parsing has the benefit over for instance eager parsing that irrelevant data fields preceding the data fields of interest can also be ignored in the parsing process.

However, this technique relies on a user identifying suitable candidates for opaque parsing in an input message. This requires detailed design time knowledge, including an understanding of the message contents, and requirements of any message mediation flow processing. Such information may not be available to a user. In addition, the actual contents of a message at runtime can have a significant impact on the processing costs of the message, and these contents may not be well known to a message flow designer.

BRIEF SUMMARY OF THE INVENTION

The present invention seeks to provide a method for parsing a message that can benefit from improved parsing cost reduction.

The present invention further seeks to provide a computer program product including computer program code for implementing this method when executed on a processor of a data processing system.

The present invention yet further seeks to provide a data processing system adapted to execute this computer program code.

According to an aspect, there is provided a computer-implemented method of parsing a message comprising a sequence of data fields, the method comprising evaluating program code for processing the parsed message to identify a first set of data fields of the message that are referenced in said program code; identifying the boundaries of the data fields in a schema defining the format of said message; identifying a second set of data fields in said schema related to the first set of data fields by reference, said second set further including the first set; and sequentially parsing the data fields in said message using the identified data field boundaries, wherein said parsing step comprises skipping data fields in said sequence that precede the first data field belonging to the second set.

By evaluation of the program code, e.g. the message flow logic, for a particular message to identify data fields of relevance to the message flow and by subsequent evaluation of the message schema of a particular message to identify the location of the data fields of relevance in the message, the relevant data fields in the message can be identified and the parsing of the message can be limited to the relevant data fields. In particular, the relevant data fields preceding the first relevant data field in the sequence of data fields in the message can be parsed opaquely without requiring a user to select the candidate data fields for opaque parsing. This therefore not only reduces the risk of relevant data not being parsed due to a user incorrectly identifying a particular type of data as irrelevant to the message flow, but it furthermore maximizes the cost savings produced by the opaque parsing process.

The message may have a tree structure, wherein the data sequence of data fields comprises sequence groups, each group defining a parent node and N sibling nodes of the tree, wherein N is an integer of at least zero. In other words, the message may be a hierarchical message.

For such a hierarchical message, the parsing step may comprise skipping all data fields belonging to the same sequence group if the sequence group does not contain said first data field. This has the advantage that the parsing process becomes relatively straightforward as little evaluation of each branch of the tree is required.

The parsing step may further comprise skipping all data fields of a sequence group preceding said first data field. This further reduces the number of data fields that require explicit parsing.

In an embodiment, the parsing step comprises skipping all data fields not belonging to the second set in order to minimize the number of data fields that require explicit parsing.

The program code (message flow logic) may comprise a conditional expression including a plurality of branches, each of said branches referencing a different one of said data fields, said branch decision depending on a further data field downstream in said sequence relative to at least some of the data fields in said branches. In such a scenario, the method may further comprise collecting run-time statistics from the parsing of a plurality of messages to determine the frequency of each branch being taken; selecting branches that are taken at a frequency above a defined threshold; identifying the data fields referenced by the selected branches; and skipping the parsing of data fields referenced by unselected branches. This adds predictive opaque parsing to the method by avoiding the explicit parsing of data fields referenced by branches there are statistically unlikely to be taken by the message flow. This further reduces the cost of the parsing process.

The selecting step may comprise selecting the most frequently taken branch only.

Typically, when applying such predictive opaque parsing, the method further comprises parsing the further data field; evaluating the parsing result; and returning to the skipped data field referenced by an unselected branch in case the further data field requests the taking of said unselected branch; and repeating said parsing step starting from said previously skipped data field and including the previously skipped data field in said repeated parsing step. This ensures that the relevant data field referenced by the selected branch is explicitly parsed.

The method may further comprise producing an output message including unparsed data fields not belonging to said second set and parsed data fields belonging to said second set. Such an output message can be produced in a cost-effective manner.

Embodiments of the present method are particularly suited for use with XML messages although any suitable message, i.e. a message for which the lengths of the respective data fields of the message can be identified, may be parsed in accordance with embodiments of the present invention.

According to another aspect, there is provided a computer program product comprising a computer-readable data carrier, said carrier comprising computer program code for implementing the method according to one or more embodiments of the present invention when executed on at least one processor of a data processing system.

According to yet another aspect, there is provided a data processing system comprising at least one processor and the computer program product according to one or more embodiments of the present invention, wherein the at least one processor is adapted to execute the computer program code of said computer program product.

The data processing system may further comprise the program code for processing the parsed message; and/or the schema defining the format of said message.

The data processing system may be adapted to act as a message broker between a message producer and a message consumer.

The data processing system may be adapted to implement a part of a service-oriented architecture.

BRIEF DESCRIPTION OF THE DRAWINGS

Preferred embodiments of the present invention will now be described, by way of example only, with reference to the following drawings, in which.

DETAILED DESCRIPTION OF THE EMBODIMENTS

Figure 1:
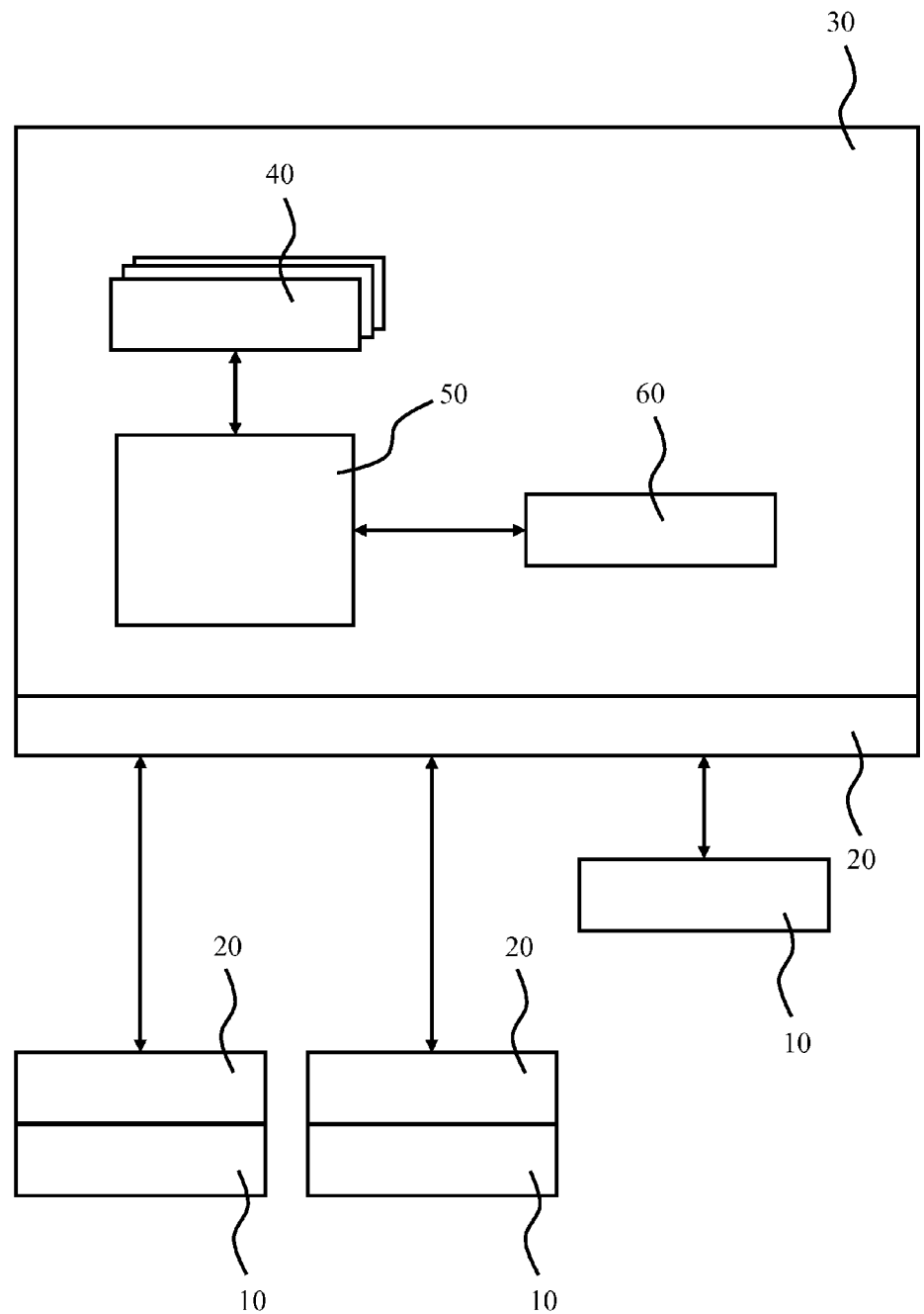
FIG. 1 schematically depicts a SOA according to an embodiment of the present invention.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

In the context of the present application, a (data processing) system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

FIG. 1 is a schematic representation of a service oriented architecture including a messaging network in which a number of application programs 10 are communicating via messaging manager programs 20 which provide message delivery services and via a message broker 30 which implements a set of rules to provide message routing and message transformation (and message creation in response to certain received messages). It will be understood that the application programs 10, the messaging manager programs 20 and the message broker 30 are typically hosted by one or more data processing devices having one or more processors adapted to execute computer program code that implements these programs. The message routing may be provided by program code implementing mediation flow control, which mediation flow control logic may further define transformation logic, e.g. for transforming a message parsed by a parser. An example of such transformation logic is the combination of a separate first name and surname produced by the parser into a single data field for presenting to the destination of the transformed parsed message.

The message broker 30 and messaging manager programs 20 enable diverse applications to exchange information in unlike forms—the brokers handling the processing required for the information to arrive in the desired place in the correct format and the messaging manager programs handling the complexities of network communications to provide assured delivery of messages across the network between different computer systems.

The brokers are a resource which hosts and controls message flows 40 which implement business processes. Applications send messages to a message flow, which is a sequence of message processing nodes that each implement rules (a set of processing actions), to process the messages and generate one or more outputs for sending to target applications. Among many other capabilities, the brokers provide the capabilities to route a message to several destinations using rules that act on the contents of one or more data fields in a message, such as in the message payload or in the message header; and to transform a message so that applications using different formats can exchange messages in their own formats. The broker, e.g. the mediation flow logic within the broker, knows the requirements of each application (for example, whether personal names should have the surname first or last, with or without middle initials, upper or lower case) and so it can transform the message to the correct format (changing the order of fields, the byte order, the language, and so on).

Each message flowing through a message broker has a specific structure, which is important and meaningful to the applications that send or receive that message. Message structure information may for instance comprise a message domain, message set, message type, and wire format of the message. Together these values identify the structure and format of the data the message contains. Every message flow that processes a message conforming to this structure and format must understand it to enable the message bit stream to be interpreted.

The message structures which can be handled by the message brokers comprise those which are predefined within one or more message repositories 60 as well as self-defining message structures (such as message data in XML which is a string of name-value pairs such the parser can simply locate a specified name in a message and extract the data value). The message repositories hold information for a number of message formats defining the arrangement of named data fields in messages of the respective format. Such information is commonly referred to as a message schema. A format name lookup step can extract the message schema which can be applied to any message complying with the format defined in the extracted message schema to generate a view of the message as a sequence of name-value pairs which can be interpreted and manipulated. In particular, the message schema allows the detection of the boundaries of the data fields that define such values.

When a message is to be processed by a message flow, it is first necessary to decode the message bit stream using one or more message parsers 50 to enable the various components of the message to be understood. Message type and format information for messages predefined in the message repositories is typically included in the messages' headers, and so a parser can recognize the message structure and format when the message is received. Messaging products such as IBM's Integration Bus™ product are known to include a number of message parsers 50 which can parse known message structures including specific headers.

A particular problem that arises when parsing such messages is that the message frequently contains a large amount of content that is irrelevant to the intended destinations. This is because the message typically utilizes only a (small) subset of the available data fields, i.e. the data fields relevant to the particular service requested. It is therefore desirable to be able to only parse the relevant data fields in order to reduce the cost of the parsing process. However, it is far from trivial to achieve this in an automated fashion. Instead, such selective parsing techniques are typically user-defined if at all possible, as this requires the user to have in-depth knowledge of which data fields in a message are relevant to the particular service request. This often is complex knowledge, because a message may comprise data fields that refer to other data fields in the same message, for instance because multiple data fields rely on the same parent value, because a referenced data field specifies a format of another data field referencing this data field, e.g. the referenced data field specifies a codepage used to define some of the data fields in the message, and so on.

Figure 2:
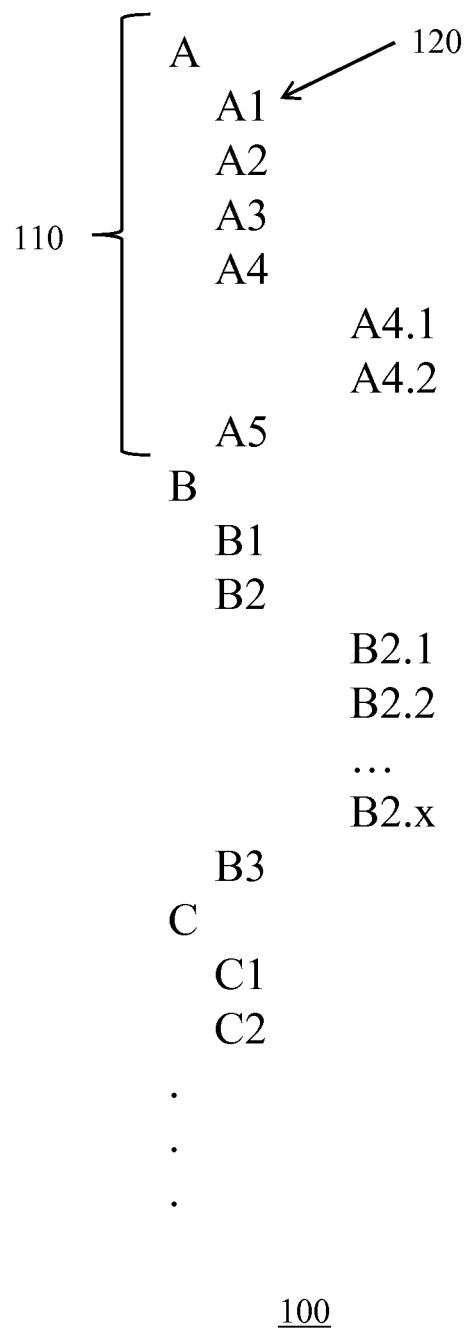
FIG. 2 schematically depicts an example message structure for use in the SOA of FIG. 1.

FIG. 2 schematically depicts an example structure of a payload portion of a message 100. The message 100 in this example has a hierarchical or tree structure in which different branches 110 of data fields 120 are organized in parent nodes A, B, C that may have one or more siblings, e.g. A1-A5, which siblings may have siblings of their own, e.g. A4.1 and A 4.2, as is well-known per se. As mentioned above, some of the data fields 120 may include a reference to another data field in the message 100, such that there is a dependency or relationship between these data fields.

In order for a parser 50 to be able to opaquely parse parts of the message 100, the parser requires knowledge about where a previous data field ends and the next data field begins in a bit stream representing the message 100. In other words, the parser 150 requires knowledge about the boundaries of such data fields 120. This information is typically present in the repository 60, more specifically in a message schema in this repository belonging to the message 100, which schema typically specifies the length of the various data fields 120 and the type of information held by these data fields. For instance, the message schema may specify that data field A1 is a 2-byte or 4-byte data field containing a codepage identifier, e.g. identifying UTF-16, whereas data field B2 is a 8-bit data field that references data field A1, and so on.

In order for a parser 50 to be able to opaquely parse parts of the message 100, the parser furthermore requires knowledge about which of the data fields 120 in the message 100 are of importance to the mediation flow logic 40, e.g. scanning xsl, xpath, mapping logic, API calls in custom logic and so on, i.e. which of the data fields 120 in the message 100 are required to route the (parsed) message 100 to the appropriate application 10. This is further explained by the following simple example of such mediation flow logic:

InputNode→Route→OutputNode
Label 1: logic contains processing related to data field B1
Label 2: logic contains processing related to data field B2
Label 3: logic contains processing related to data field B3
IF C.C1=1 THEN LABEL 1;
IF C.C1=2 THEN LABEL 2;
IF C.C1=3 THEN LABEL 3.

In words, this flow logic example contains three processing threads, which execution is dependent on the conditional expression that requires evaluation of the value of the data field C.C1. If this data field contains a value 1, the processing thread identified as Label 1 will be executed, thus requiring data field B1. If this data field contains a value 2, the processing thread identified as Label 2 will be executed, thus requiring data field B2. If this data field contains a value 3, the processing thread identified as Label 3 will be executed, thus requiring data field B3. In this example, as there is no reference to parent data field A and its siblings, this branch 110 of the message 100 becomes a candidate for opaque parsing.

In the context of the present application, the term opaque parsing is used to refer to the skipping of the parsing of data fields prior to a data field of relevance to the mediation flow logic of the message broker 30. Such skipping may include simply copying the bits of the data fields involved into the output of the parser 50, which for instance may be an output message or another form of output such as a output result to be processed by an application 10 associated with the message broker 30. At this point, it is noted for the sake of completeness that by skipping the parsing of such data fields 120, poor quality code or data may be transferred unnoticed between e.g. messages. Solutions to this particular problem are beyond the scope of the present application; in the context of the present application this is not a critical problem as such code or data is irrelevant to the successful brokering of the relevant parts of the message 100.

Figure 3:
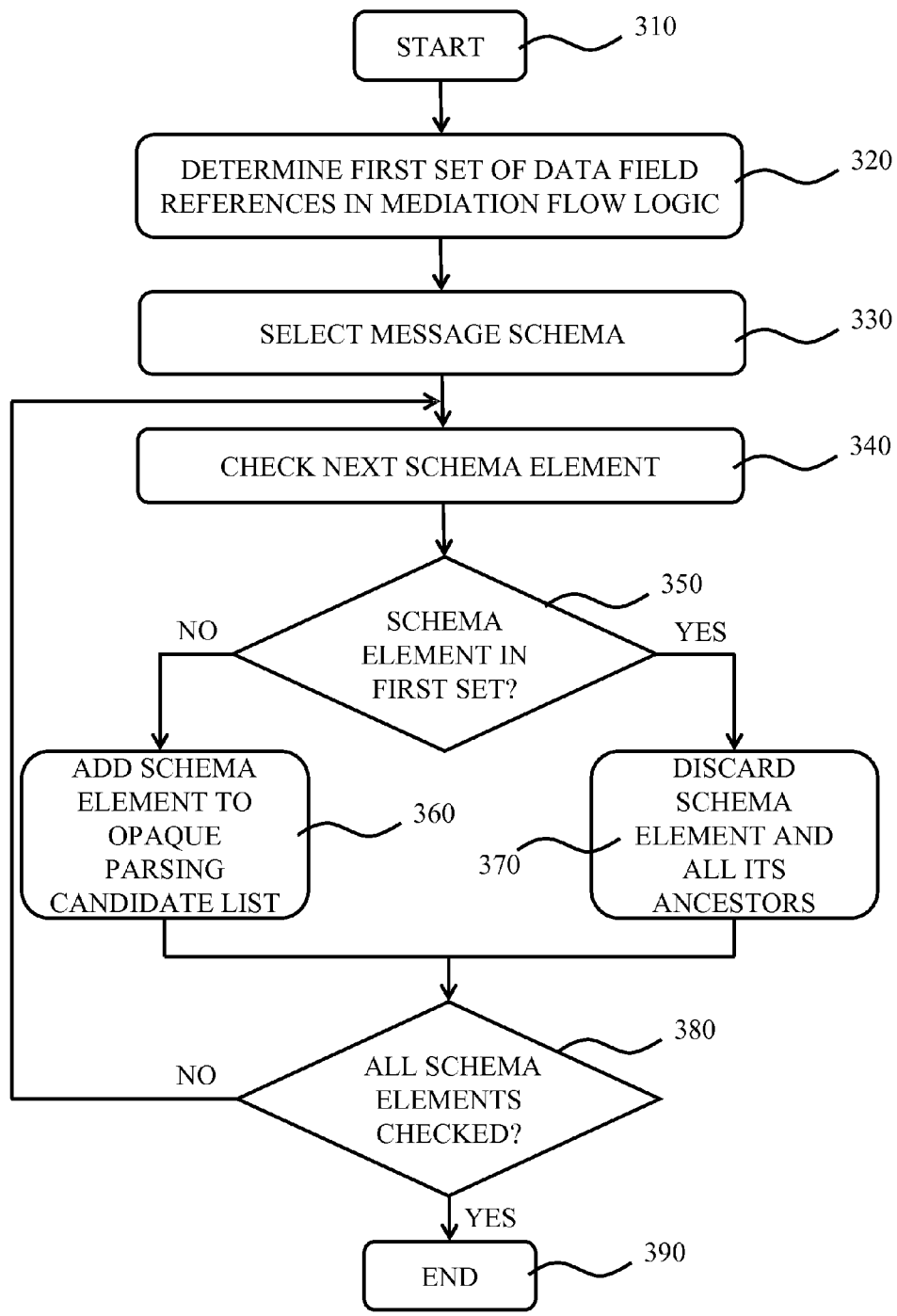
FIG. 3 schematically depicts a flow chart of an aspect of a method according to an embodiment of the present invention.

In order to identify opaque parsing candidates, the relevant message evaluation logic may be adapted to implement the method as shown in FIG. 3. The method starts in step 310 after which the method proceeds to step 320 in which the mediation flow logic is evaluated to identify the relevant data fields 120 in a message 100 corresponding to a particular message schema. The relevant data fields 120 are grouped into a first set of data fields, which first set identifies the data fields 120 that must not be opaquely parsed.

The method then proceeds to step 330, in which the appropriate message schema is selected, after which the method proceeds to step 340, in which each schema element is evaluated to identify if the schema element is referenced by one of the data fields in the first set. This is checked in step 350. If the schema element is indeed referenced by one of the data fields in the first set, the schema element cannot be opaquely parsed, such that the method must proceed to step 370 in which the schema element is discarded as a candidate for opaque parsing. This can be seen as a creation of a second set of data fields 120 that are related to the data fields 120 in the first set. The second set typically is an expansion of the first set, i.e. also includes the data fields of the first set. If on the other hand the schema element is not referenced by any one of the data fields in the first set, the schema element may be added to a list of data fields in step 360, which list of data fields identify the opaque parsing candidates in a message 100 according to the message schema. This candidate list may identify individual data fields 120 or branches 110 of data fields 120, e.g. parent data fields and their siblings.

Next, it is checked in step 380 if all schema elements have been evaluated in this manner. If this is not the case, the method returns to step 340 in which the next schema element in the message schema is evaluated; otherwise, the message terminates in step 390.

Figure 4:
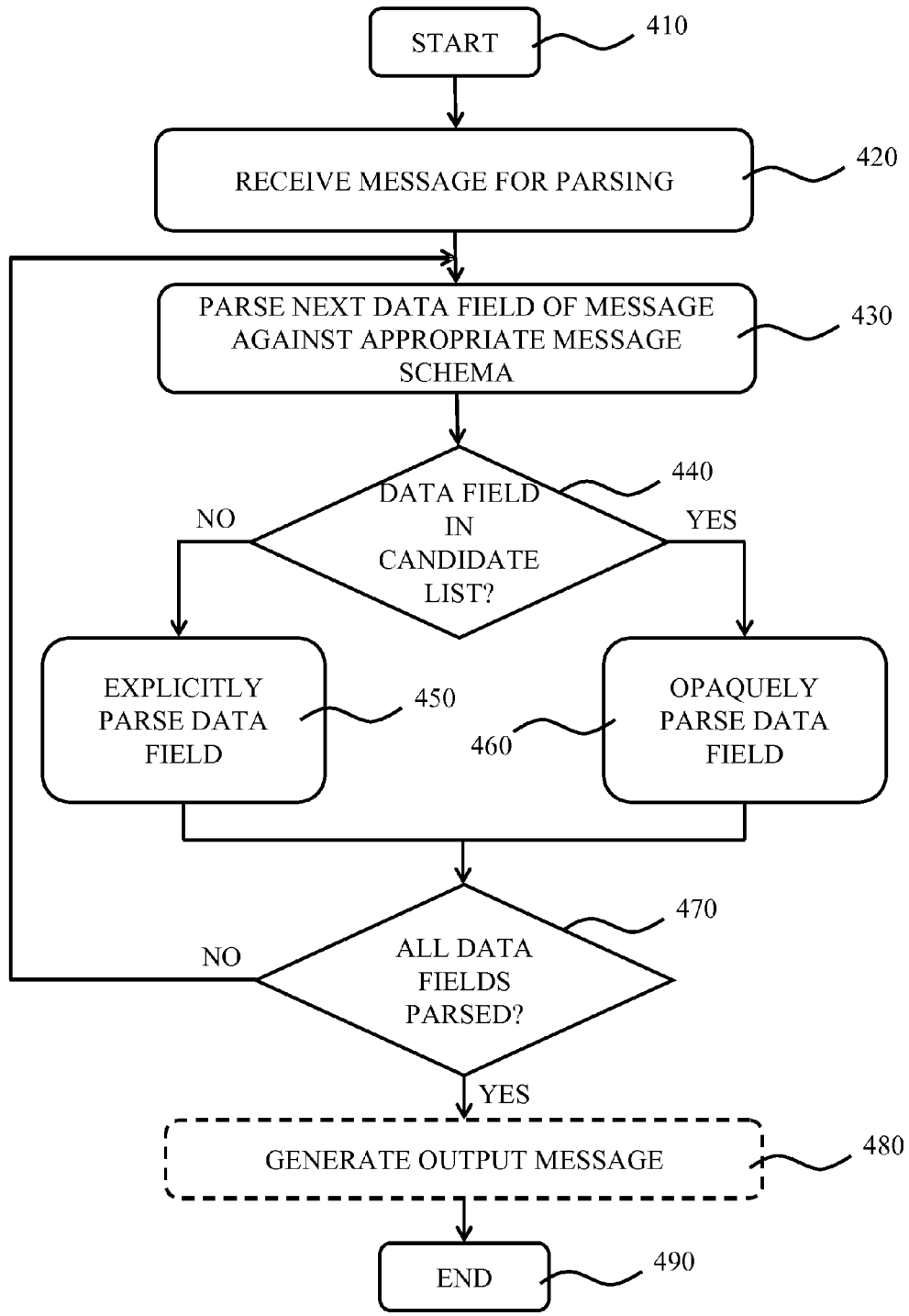
FIG. 4 schematically depicts a flow chart of another aspect of a method according to an embodiment of the present invention.

The thus generated list of data fields 120 that are candidates for opaque parsing may be used by the parser 50 when parsing an incoming message 100. To this end, the parser 50 may be adapted to implement a method as shown in FIG. 4. The method starts in step 410 after which the method proceeds to step 420 in which a message 100 to be parsed is received. In step 430, the parser 50 evaluates the next data field 120 of the message 100 against the appropriate message schema, e.g. to determine the boundary of the data field 120, that is the length of the data field 120 as specified in the message schema.

Next, the parser 50 checks in step 440 if the data field is in the list of candidates to be opaquely parsed. If it is not, the parser proceeds to step 450 in which the data field is explicitly parsed (i.e. not skipped). If on the other hand the data field 120 is in this candidate list, the parser proceeds to step 460 instead in which the data field is opaquely parsed. The parser then proceeds to step 470 in which it is checked if all data fields 120 of the message 100 have been evaluated (sequentially parsed). If this is not the case, the method returns to step 430 in which the next data field 120 of the message 100 is evaluated as previously explained. Otherwise, the method may terminate in step 490.

An optional step 480 may be performed prior to terminating the method in step 490, in which an output message is generated comprising unparsed data fields 120 not belonging to the aforementioned second set of relevant data fields and parsed data fields belonging to the aforementioned second set of relevant data fields, i.e. data fields 120 of relevance to the mediation flow logic 40 that are referenced in the message schema of the message 100.

In accordance with an embodiment of the method as depicted in FIG. 4, the parser 50 may opaquely parse entire groups 110 of data fields 120, i.e. an entire family of data fields 120. This approach for instance may be chosen if in the method of FIG. 3 data fields are only added to the candidate list in case each data field 120 in the group or family 110 is irrelevant to (i.e. not referenced by) the mediation flow logic 40. Alternatively, the parser 50 may also opaquely parse selected data fields 120 belonging to a group 110 comprising one or more data fields referenced by the mediation flow logic 40, which selected data fields 120 typically are irrelevant to the mediation flow logic 40.

As will be understood by the skilled person, the embodiment shown in FIG. 4 provides a static analysis of a message 100 based on the information compiled from the mediation flow logic 40 and the appropriate message schema as explained in more detail with the aid of FIG. 3 prior to receiving the message 100. In another embodiment, such a static analysis may be combined with dynamic or run-time analysis to further increase the number of candidate data fields 120 for opaque parsing.

As shown in the example of the mediation flow logic 40, such logic or program code typically contains conditional expressions that trigger different branches being taken depending on the value of a data field 120 in the message 100. Such a data field will also be referred to as a branch-triggering data field. These branches were identified in the above example as Labels 1-3. In case the branch-triggering data field 120 is located upstream in the sequence of data fields of the message 100, the value extracted from the branch-triggering data field 120 may be used to opaquely parse the downstream data fields 120 referenced by branches that are not taken, e.g. data field B1 in Label 1.

However, this is not as easily achievable if the branch-triggering data field 120 is located downstream in the message 100 relative to the data fields referenced by the respective branches. In theory, this may be solved by providing the parser 50 with look-ahead functionality, but this often is practically unfeasible for cost and performance reasons. Instead, in an embodiment, the message broker 30, more specifically the parser 50, may employ a heuristic approach by employing run-time analysis of a plurality of messages 100 relevant to the particular mediation flow logic 40 to obtain a statistical analysis of the probability that the message 100 will trigger a particular branch to be taken.

For instance, in the above example of the mediation flow logic 40, the following statistically determined probabilities may be derived by the parser 50 at run-time:

Label 1: 2%
Label 2: 3%
Label 3: 95%

The parser 50 may employ a probability threshold and may decide to opaquely parse the data fields 120 referenced by those branches that have a probability of being taken that lies below the probability threshold. For instance in the above example, if the parser 50 employs a probability threshold of 90%, the parser 50 may decide to opaquely parse the data fields 120 referenced by Labels 1 and 2 and to only explicitly parse the data fields 120 referenced by Label 3.

Figure 5:
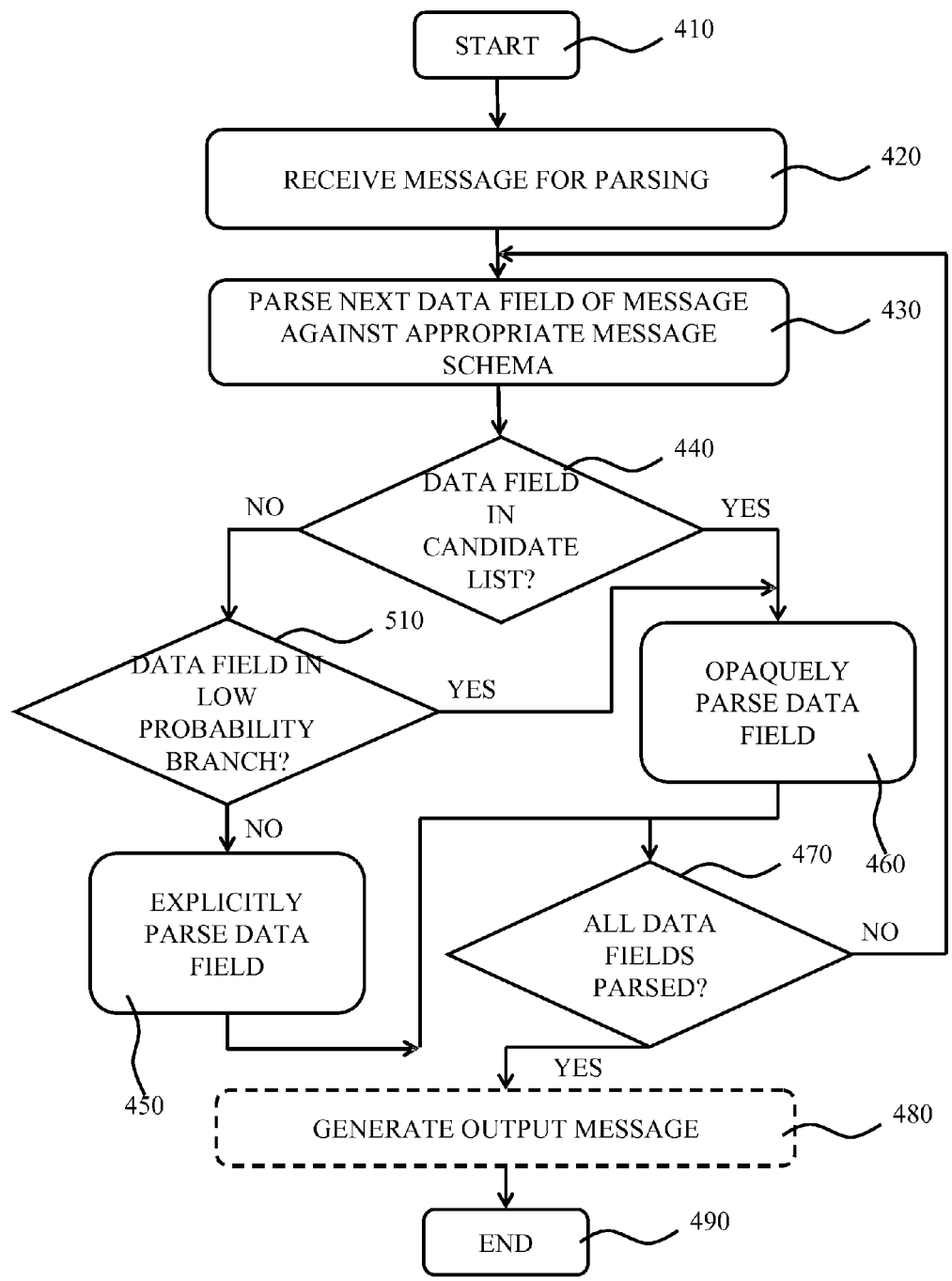
FIG. 5 schematically depicts a flow chart of an aspect of a method according to another embodiment of the present invention.

This embodiment is schematically depicted in FIG. 5. The method shown in FIG. 5 is identical to the method in FIG. 4 apart from the additional step 510. As the other steps are identical to the steps already described in the detailed description of FIG. 4, these steps will not be described again for the sake of brevity only. As can be seen in FIG. 5, after the parser 50 has determined in step 440 that a data field 120 is not in the candidate list for opaque parsing, the parser 50 may subsequently evaluate in step 510 if this data field is referenced by a branch of the mediation flow logic for which it has been determined that this branch has a probability of being taken that lies below the aforementioned probability threshold. If this is the case, the method may proceed to step 460 in which this data field is opaquely parsed. Otherwise, the data field is explicitly parsed in step 450 as before.

It will be appreciated that if it is subsequently determined when parsing the branch-triggering data field 120 that one of the low probability branches has to be taken, this method will suffer a small overhead because the parser 50 must return to the previously skipped data field referenced by this branch in order to explicitly parse it. However, if the probability threshold is set correctly, the gains in parser performance that are achieved in the vast majority of cases when the high probability branch is being taken will outweigh the performance penalty suffered if the parser 50 must return to such a previously opaquely parsed data field.

As will be appreciated by one skilled in the art, aspects of the present invention may be embodied as a data processing system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable storage medium(s) having computer usable program code embodied thereon.

Any combination of one or more computer readable storage medium(s) may be utilized. The computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present invention are described with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The invention claimed is:

1. A computer-implemented method of parsing a message comprising a sequence of data fields, the method comprising:

evaluating program code for processing the message to identify a first set of data fields of the message that are referenced in the program code;

identifying boundaries of the first set of data fields in a schema defining a format of the message;

identifying a second set of data fields in the schema, the second set of data fields being related to the first set of data fields by reference, the second set of data fields further including the first set of data fields;

sequentially parsing the message using the boundaries of the first set of data fields, wherein sequentially parsing comprises skipping, according to the sequence, a subset of data fields of the first set of data fields that precede in the sequence a first occurrence of a data field belonging to the second set of data fields, wherein the program code comprises a conditional expression including a plurality of branches, each of said branches referencing a different one of said data fields, said branch decision depending on a further data field downstream in said sequence relative to at least some of the data fields in said branches, the method further comprising:

collecting run-time statistics from the parsing of a plurality of messages to determine the frequency of each branch being taken;

selecting branches that are taken at a frequency above a defined threshold;

identifying the data fields referenced by the selected branches; and skipping the parsing of data fields referenced by unselected branches that precede the data fields of the selected branches in said sequence.

2. The method of claim 1, wherein the message has a tree structure, wherein the data sequence of data fields comprises sequence groups, each group defining a parent node and N sibling nodes of the tree, wherein N is an integer of at least zero.

3. The method of claim 2, wherein the parsing step comprises skipping all data fields belonging to the same sequence group if the sequence group does not contain said first data field.

4. The method of claim 2, wherein the parsing step comprises skipping all data fields of a sequence group preceding said first data field.

5. The method of claim 1, wherein the parsing step comprises skipping all data fields not belonging to the second set.

6. The method of claim 1, wherein said selecting step comprises selecting the most frequently taken branch only.

7. The method of claim 1, further comprising:
parsing the further data field;
evaluating the parsing result;
returning to the skipped data field referenced by an unselected branch in case the further data field requests the taking of said unselected branch; and
repeating said parsing step starting from said previously skipped data field and including the previously skipped data field in said repeated parsing step.

8. The method of claim 1, further comprising producing an output including unparsed data fields not belonging to said second set and parsed data fields belonging to said second set.

9. The method of claim 1, wherein the message is an XML message.

10. A computer program product comprising a non-transitory computer-readable data carrier, said carrier comprising computer program code for implementing the method of claim 1 when executed on at least one processor of a data processing system.

11. A data processing system comprising at least one processor coupled to a memory having program code that is configured to perform, when executed by the at least one processor, steps of:
evaluating program code for processing the message to identify a first set of data fields of the message that are referenced in the program code;
identifying boundaries of the first set of data fields in a schema defining a format of the message;
identifying a second set of data fields in the schema, the second set of data fields being related to the first set of data fields by reference, the second set of data fields further including the first set of data fields; and
sequentially parsing the message using the boundaries of the first set of data fields, wherein sequentially parsing comprises skipping, according to the sequence, a subset of data fields of the first set data fields that precede in the sequence a first occurrence of a data field belonging to the second set of data fields, wherein the program code comprises a conditional expression including a plurality of branches, each of said branches referencing a different one of said data fields, said branch decision depending on a further data field downstream in said sequence relative to at least some of the data fields in said branches, the method further comprising:
collecting run-time statistics from the parsing of a plurality of messages to determine the frequency of each branch being taken;
selecting branches that are taken at a frequency above a defined threshold;
identifying the data fields referenced by the selected branches; and
skipping the parsing of data fields referenced by unselected branches that precede the data fields of the selected branches in said sequence.

12. The data processing system of claim 11, wherein the system further comprises processing the parsed message, wherein the schema defines the format of said message.

13. The data processing system of claim 11, wherein the data processing system is adapted to act as a message broker between a message producer and a message consumer.

14. The data processing system of claim 11, wherein the data processing system is adapted to implement a part of a service-oriented architecture.

* * * * *